United States Patent [19]
Shepherd

[11] Patent Number: 4,544,430
[45] Date of Patent: Oct. 1, 1985

[54] PRODUCTION OF ARTWORK

[75] Inventor: John V. Shepherd, Ashford, England

[73] Assignee: Letraset Limited, London, England

[21] Appl. No.: 345,400

[22] Filed: Feb. 3, 1982

[30] Foreign Application Priority Data

Feb. 6, 1981 [GB] United Kingdom ................. 8103677

[51] Int. Cl.[4] .......................... B44C 1/16; B44C 3/00; B32B 1/00

[52] U.S. Cl. .................................... 156/235; 156/240; 156/241; 156/344

[58] Field of Search ............... 156/235, 236, 240, 247, 156/289, 249, 241, 155, 344; 428/204, 207, 914; 101/34

[56] References Cited

U.S. PATENT DOCUMENTS

| | | | |
|---|---|---|---|
| 2,020,717 | 11/1935 | Ansell | 156/240 |
| 3,334,003 | 8/1967 | Edwards | 156/236 |
| 3,350,254 | 10/1967 | Morgan et al. | 156/235 |
| 3,376,182 | 4/1968 | Borell et al. | 156/236 |
| 3,554,834 | 1/1971 | Bennett et al. | 156/247 |
| 3,676,248 | 7/1972 | Swartz | 156/235 |
| 3,898,357 | 8/1975 | Miller et al. | 156/240 |
| 3,930,092 | 12/1975 | Shapiro | 428/204 |
| 4,089,722 | 5/1978 | Holoubek | 156/235 |

FOREIGN PATENT DOCUMENTS

| | | |
|---|---|---|
| 542065 | 9/1973 | Switzerland . |
| 1039850 | 8/1966 | United Kingdom . |
| 1217915 | 1/1968 | United Kingdom . |
| 2005596 | 4/1979 | United Kingdom . |

*Primary Examiner*—Edward Kimlin
*Assistant Examiner*—Louis Falasco
*Attorney, Agent, or Firm*—Darby & Darby

[57] ABSTRACT

Legends are built up from dry transfers in the usual way but on an intermediate carrier. Water or other liquid is applied to the rear surface of the intermediate carrier and an adhesive tape or sheet applied over the letters. The adhesive tape is then peeled away from the intermediate carrier bearing the letters which can then be adhered where desired, e.g. on a background scene or in a frame, using their own adhesive, whereafter the adhesive tape or sheet is peeled away to leave the letters looking as though they had been transferred there in the usual way.

10 Claims, 9 Drawing Figures

PRODUCTION OF ARTWORK

BACKGROUND OF THE INVENTION

This invention relates to the production of artwork.

The explosive growth over the last few decades of the graphics art industry particularly in the field of advertising has been made possible in part by the development of graphic arts materials consisting of sets of indicia such as letters, numbers, symbols and the like which are preformed and selected for use by the graphic artist rather than having to be drawn out each time. The most widespread examples of such products are various diecut vinyl sign lettering materials and dry transfer materials.

When using such materials, the user normally requires to produce a legend on artwork, for example to assemble one or more words to form a headline or slogan, each word being assembled from individual letters. In order to achieve the desired effect, the individual letters must be spaced correctly relative to one another and the whole of the word or slogan or the like must be positioned relative to other components of the artwork. This is sometimes difficult to achieve in practice, since one has to build up the legend letter by letter and one cannot see the whole legend visually until it has been so built up. If positioning in the other artwork e.g. a background photograph or frame also has to be achieved, a highly developed sense of optical balance and positioning is required in the user. This is a skill which is very difficult to acquire and indeed is never acquired adequately even by many professionals.

In order to avoid this difficulty, various techniques have been developed but none is entirely satisfactory. One of the simplest techniques is to form the legend or so-called wordset on a sheet of transparent material such as cellulose acetate. This enables the letters to be positioned relative to one another as desired and if more than one word is formed, enables the words to be mutually relatively positioned appropriately. The transparent sheet can then be overlaid on the background and moved round until the desired position is achieved, whereafter the whole sheet may be adhered to the artwork or attached to a base e.g. by a masking tape hinge. Such a system clearly fails to simulate the desired final artwork very adequately. Using vinyl sign lettering is easier than using dry transfer since the individual letters can be handled without too much difficulty or danger of distortion or breakage. Thus the desired letters may be assembled on a surface, each letter being still attached to its release paper or card backing and the wordset so formed can then be consolidated by applying e.g. masking tape to the individual letters. This enables the word or words to be moved as a whole and, after the backings have been removed from the letters, because of the highly tacky adhesive on them they can be firmly adhered in the desired position on the artwork and will stay there when the masking tape or the like is pulled away. This system requires some skill to work it satisfactorily but its chief defect is that vinyl sign lettering is only available in relatively large letter sizes and a few typeface styles. The flexibility of typeface style and letter size found in dry transfer material is simply not available.

SUMMARY OF THE INVENTION

According to the present invention there is provided a method of producing artwork in which a desired legend is assembled using a dry transfer material on an intermediate carrier by transferring indicia sequentially from a dry transfer material to the surface of the intermediate carrier to which the letters adhere by virtue of an adhesive layer covering the indicia on the dry transfer material, adhering an adhesive web material to the sides of the indicia remote from the intermediate carrier, applying a liquid to the side of the intermediate carrier remote from the adhesive web to reduce the peel bond strength of the adhesive bond between the layer of adhesive attaching the indicia to the intermediate carrier and the surface of the intermediate carrier to a value lower than the adhesive bond between the adhesive web and the indicia, peeling apart the adhesive web and the intermediate carrier to leave the indicia with their adhesive surfaces exposed on the adhesive web, positioning the adhesive web indicia side down over the artwork in which it is desired to incorporate the legend formed from the indicia, applying pressure through the adhesive web in the area of the indicia to adhere the indicia to the artwork with a peel bond strength greater than that of the adhesive web to the indicia and peeling away the adhesive web to leave the indicia adherent to the artwork.

BRIEF DESCRIPTION OF THE DRAWING

A better understanding of the invention may be gained from a consideration of the following detailed description of the preferred embodiments thereof, in conjunction with the appended drawing, wherein.

DESCRIPTION OF THE PREFERRED EMBODIMENTS

Figure 1:
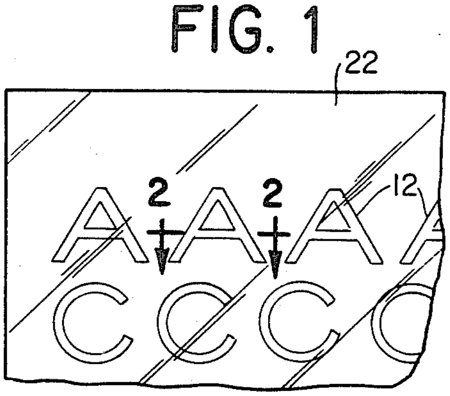
FIG. 1 is a plan view of a carrier film to which multiple indicia are adhered.
Figure 2:
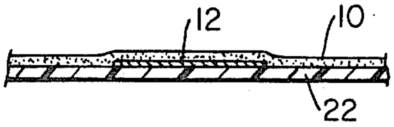
FIG. 2 is a sectional view taken along the line 2—2 of FIG. 1 and looking in the direction of the arrows.
Figure 3:
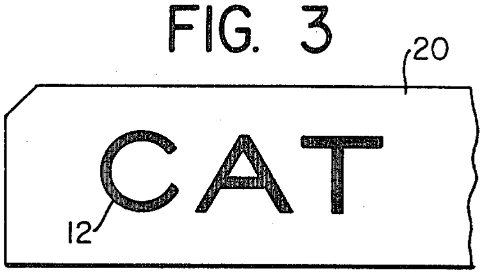
FIGS. 3 through 8 are schematic views respectively showing successive stages in the production of artwork by the method of the invention.
Figure 4:
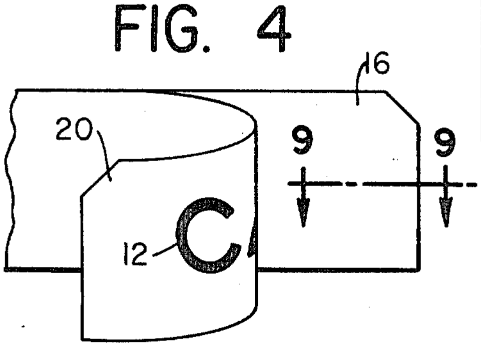
Figure 5:
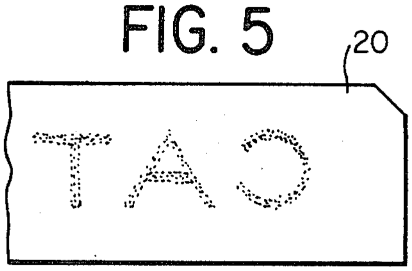
Figure 6:
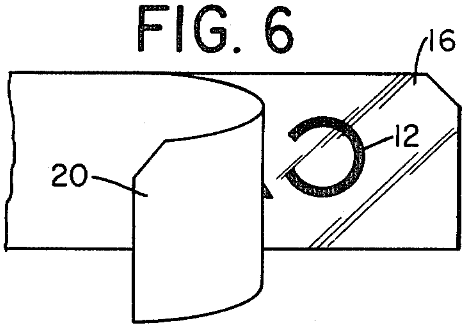
Figure 7:
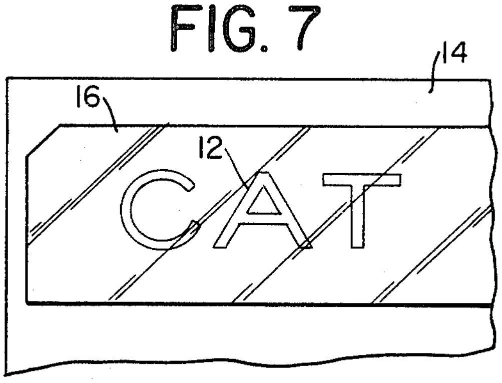
Figure 8:
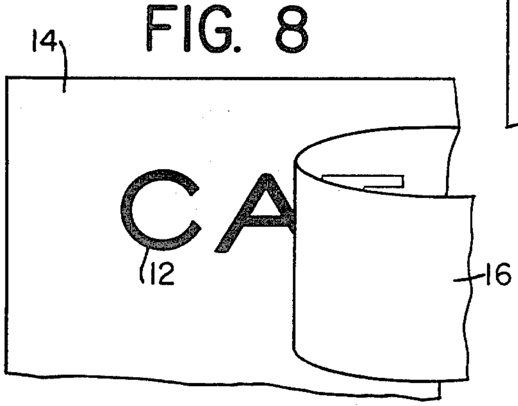
Figure 9:
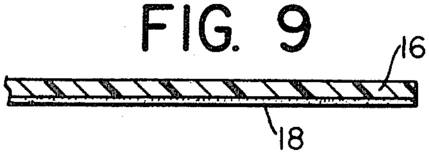
FIG. 9 is a sectional view taken along the line 9—9 of FIG. 3 and looking in the direction of the arrows.

In order for this method to work it is clearly necessary that the adhesive 10 on the indicia or dry transfer material 12 should form a bond to the final receptor surface 14, i.e. the artwork surface, stronger than the bond between the adhesive web 16 and the indicia 12; in other words the dry peel bond strength of the adhesive on the adhesive web to ink indicia 12 must be less than the dry peel bond strength of the adhesive 10 on those ink indicia 12 to the final receptor surface 14. The latter bond strength, however, which is predominantly a function of the nature of the adhesive 10 forming part of the original dry transfer material 12, must be reducible if the intermediate substrate 20 is treated with a liquid as happens prior to the removal of the indicia from the intermediate substrate. Whether the system will operate correctly or not clearly depends on a large number of factors, predominantly the nature of the adhesive 10 used in the dry transfer material, the nature of the surface of the intermediate substrate 20 and the nature of the liquid.

Peel bond values achieved using adhesives of the type indicated above tend to be very low but they can be measured using conventional peel bond value measuring equipment and appropriate experimental techniques. In a peel bond test procedure, the ink and intermediate carrier 20 are first adhered together under pressure, whereafter they are peeled apart at a suitable site using a tensile tester such as that sold under the Registered Trade Mark INSTRON.

In order to standardise procedure for this purpose to secure repeatable results, the following detailed test method should be adopted: first, the specimens to be tested should be manufactured in the form of adhesed ink strips where the ink is not self-supporting but is firmly supported on a strong backing film 22. In place of printing the ink and adhesive on to a carrier film in order to construct a dry transfer material, the ink and adhesive are successively printed on to a carrier film 22 in such a way that a transfer material is not produced but rather a material is produced in which the ink is firmly bonded to the carrier film 22. 23 Micron thick polyethylene terephthalate film (Melinex ex I.C.I.) is to be adopted as a standard substrate. (MELINEX is a Registered Trade Mark).

In the test method a strip of such material conveniently about 2 cms wide, is laminated to the intermediate carrier 20 (e.g. a sheet of paper) by subjecting the test material and paper to a static pressure of 60 kg/cm$^2$ for 10 seconds using a hydraulic press. The strip of film carrying the ink which is then adhered by the adhesive 10 to the paper 20 is then pulled off at a 180° peel angle using an INSTRON (Registered Trade Mark) tensile tester at a crosshead speed of 25 cms per minute. The force in grammes required to peel the strip off the paper 20 is noted and the peel bond then expressed as gf/cm width of strip. The peel bond figures given hereinafter were measured using this test method.

Preferably, the peel bond between the dry transfer material 12 and the intermediate substrate 20, prepared as above is at least 3 gf/cm width and most preferably at least 10 gf/cm width. Preferably the peel bond of the adhesive bond between the adhesive 10 on the dry transfer lettering 12 and the intermediate carrier 20 after treatment with liquid is less than 1 gf/cm width. It is observed that the adhesive bonds between the adhesive 10 on the dry transfer lettering 12 and the surface of the intermediate carrier 20 may well vary quite considerably with time during the liquid treatment and use may be made of this fact to produce workable systems easy and reliable to use from a wide variety of intermediate carrier types and liquids.

The liquid which may be used may be water, a mixture of water with some other liquid such as an organic solvent or an aqueous solution of a surface active agent. For certain particular systems the liquid may be an organic liquid such as a hydrocarbon liquid. Care must be taken, however, to use liquids which will not adversely affect the adhesive layer or indicia, e.g. by dissolving them.

The liquid may be applied to the side of the intermediate carrier 20 remote from the adhesive web 16 by any convenient method and using any convenient apparatus. Dipping, brushing and swabbing may all be used. The preferred method, however, is to apply a sponge pad 24 impregnated with the liquid to the intermediate carrier 20, slight pressure being applied to cause the liquid to leave the sponge and wet the intermediate carrier 20. Most preferably the sponge is provided in a plastics box carrier having a lid which can be removed to expose a wet sponge face (not shown). The box may have one or more filling holes enabling the sponge to be charged with water or other treatment liquid.

The adhesive web 16 is preferably a translucent or transparent film having an appropriate affinity on one side to enable it to adhere to the ink indicia 12 on being placed in contact therewith more strongly than those indicia adhere to the wet intermediate carrier 20. Such affinity may be achieved by applying to one face of the film a thin coating 18 of an adhesive substance, either a conventional adhesive of suitable tack and peel bond values relative to the ink indicia or some other material which will adhere adequately to the ink letters 12 at least for a sufficient time and to a sufficient degree to enable the transfer process to be carried out. Examples of such materials are silicone waxes, cured silicone release coats and water. Highly plasticised PVC film may be used as the adhesive web 16.

Preferred adhesive webs for use in the invention consist of a flexible substrate carrying a silicone release coat. These have low adhesion to the indicia of the wordset when coated at (for release coatings) high coat weights, i.e. greater than the usual coat weights of 0.1 to 0.5 g.s.m. e.g. 2 g.s.m. or more. They are able to pick up and release characters with large differences in surface area, i.e. both small and large letters can be transferred with ease.

Clearly for any given commercially available dry transfer material it will be possible to select without difficulty an appropriate combination of intermediate carrier material, liquid and adhesive web to achieve the desired results. The adhesive web 16 is conveniently first chosen to be one which is insufficiently adhesive to pull applied indicia 12 from normal receptor surfaces such as paper, artboard, cellulose acetate and thereafter the intermediate carrier 20 (usually a paper) and liquid are selected to operate to reduce the bond of the indicia 12 thereto sufficiently to enable the adhesive web 16 to remove the indicia 12 when carrying out the process.

The following examples will serve to illustrate the invention. In all cases the dry transfer material used was a standard commercially available dry transfer lettering product sold under the Registered Trade Mark LETRASET INSTANT LETTERING.

EXAMPLE 1

There was used as intermediate carrier sheets of photocopying paper (Tulip paper hydrocopier paper ex van Gelder Papier) and as adhesive web a tape consisting of a backing web of 75 microns thick polyethylene terephthalate (542 Melinex (Registered Trade Mark) ex I.C.I.) which had been coated with adhesive. The adhesive coating was applied by bar coating a solution of an adhesive polymer using a wire wound bar (wire diameter 0.4 mm) and allowing the solvent to evaporate. The coating liquid was a 10% by weight solution of a commercially available adhesive (Gelva RA 1753 ex Monsanto) in ethyl acetate.

As treatment liquid there was used an equal weight mixture of water and commercial isopropanol.

A word was first laid down by sequentially transferring letters from the dry transfer and lettering sheet to a sheet of the photocopying paper. When the word had been so assembled, the side of the paper not bearing the letters was wiped over in the area of the letters using a cotton wool swab to dampen the sheet using the treatment liquid. After a period of 15 seconds the adhesive web was laid over the word, smoothed down by hand and peeled away from the paper. It peeled off the transferred letters. This adhesive web bearing the letters on its underside was then laid on top of a sheet of Bristol board on which a frame, in which the word was to be placed, had previously been drawn. The adhesive web carrying the letters could easily be slid around on the upper surface of the Bristol board to position the word as desired and after this had been achieved, the letters were again rubbed down on to the Bristol board using a stylus. The adhesive web was then peeled away from the Bristol Board to leave the letters in their correct position in the frame.

EXAMPLE 2

Example 1 was repeated, but in place of using the treatment liquid there specified, a 0.5% by weight aqueous solution of the disodium salt dioctyl sulphosuccinic acid. Similar satisfactory results were obtained.

EXAMPLE 3

Example 1 was repeated, but in place of using the photocopier paper a commercially available laboratory filter paper (Whatmans No. 1) was used, and in place of the water/isopropanol mixture, pure water. Similar satisfactory results were obtained.

As well as carrying out the above examples, the peel bond of the adhesive bond between letters and intermediate carrier sheets in each case was determined as indicated above, both in the as transferred and in the liquid treated state. In the case of Example 1 the initial peel bond was $12\pm3$ gf/cm width which dropped to to $0.28\pm0.1$ gf/cm width on the liquid treatment. In the case of Example 2, the same initial peel bond dropped on liquid treatment to $0.6\pm0.2$ gf/cm width and in the case of Example 3 an initial peel bond of $4\pm0.4$ gf/cm width dropped on the application of water to about 0.4 gf/cm width.

EXAMPLE 4

In this Example sheets of filter paper (Whatmans No. 4) were used as intermediate carrier and sheets of release coated polyethylene terephthalate sheet (75 microns thick 542 Melinex ex I.C.I.) were used as adhesive web.

The release coating was formulated as follows (parts by weight):

Silicone coating solution containing platinum catalyst (Syloff 7046 ex Dow Corning): 100 parts
Silicone cross-linker (Syloff 7047 ex Dow Corning): 10 parts
Substrate adhesion promoter (Type 297 ex Dow Corning): 1 part
Hydrocarbon solvent (Exsol 145/160 ex Esso): 134 parts This coating composition was applied using a No. 45 meyer bar to the polyethylene terephthalate sheets to give, after curing at 120° C. for five minutes, a coating weight of 8 g.s.m.

In use, a wordset was first made up using dry transfer material in conventional fashion on the filter paper, and the filter paper then placed wordset down on top of one of the release coated polyethylene terephthalate sheets, release coat up. A moistened sponge pad was then pressed gently on the filter paper, following which the filter paper could be peeled away to leave the letters on the release coated polyethylene terephthalate sheet. This sheet was then picked up, turned over, positioned where desired over a piece of artwork, and the legend then rubbed down from the adhesive web on to the artwork whereafter the adhesive web was pulled away to leave the legend on the artwork and looking as though it had been printed there.

EXAMPLE 5

Example 4 was repeated but using as adhesive web a 75 microns thick polyethylene terephthalate sheet which bore two coatings. The first coating was a subbing coating polyvinylidene dichloride (Saran F.310 ex DuPont) which was coated from a 10% by weight solution in methyl ethyl ketone. After coating and drying the coat weight was 0.2 g.s.m.

The formulation of the subsequently applied silicone release coating was as follows (parts by weight):

Silicone polymer solution (Silicolease ex I.C.I., 30% by weight solids solution in toluene): 20 parts
Toluene: 20 parts
Catalyst (Type 62A ex I.C.I.): 0.5 parts
Catalyst (Type 62B ex I.C.I.): 0.5 parts This coating composition was applied to the subbed polyethylene terephthalate sheets using a No. 45 meyer bar to give, after curing for 15 minutes at 115° C., a dry coating of coat weight 11 g.s.m.

Similar satisfactory results to those obtained in Example 4 were achieved.

EXAMPLE 6

Example 5 was repeated using in place of the release coating formulation there specified, a formulation as follows (parts by weight):

Room temperature vulcanising silicone polymer (RTV 734 ex Dow Corning): 20 parts
Ethyl acetate: 10 parts This formulation was applied using a No. 45 meyer bar and after curing for 1 hour at room temperature the coating has a dry coat weight of 10g.s.m.

Similar satisfactory results were obtained.

In the case of certain dry transfer materials, of which Letraset Instant Lettering is one, spacing marks are associated with each of the transferable letters. These marks are transferred with successive letters and by superimposing the marks optically even spacing laterally in the finished word is automatically achieved. A particular advantage of the present invention is that such marks may be used when forming the legend on the intermediate carrier and then left there by not picking them up on the adhesive web. This may be effected by not positioning the adhesive web over them, but this means that the legend is then held on the edge of the adhesive web and this may be a little difficult to manipulate. A preferred method is to draw a line on the intermediate carrier in a suitable liquid repellant material, for example ball point pen ink. This line can then be used to give accurate vertical alignment of the letters by transferring the spacing marks down on to it each time. It is found that due to the masking effect of the line, when the liquid is applied to the rear of the intermediate carrier, it does not release the transferred spacing marks sufficiently to enable them to be picked up by the adhesive web. Thus when the adhesive web is pulled away, even though it has been laid over the legend with its spacing marks, the spacing marks are left on the intermediate carrier and only the legend is picked up for subsequent transfer to the artwork where desired.

I claim:

1. In a method of producing artwork in which a desired legend is assembled using indicia from a dry transfer material, said dry transfer material consisting of a carrier film, indicia on the carrier film and a layer of adhesive covering the indicia and having a peel bond strength, the improvement comprising:

as an initial transfer step, transferring indicia sequentially from said carrier film to a surface of an intermediate carrier sheet to build up said desired legend thereon by adhering each of said indicia in turn via said adhesive layer covering said indicia in said dry transfer material to said intermediate carrier sheet, and removing said carrier film therefrom, as an intermediate transfer step, transferring the entire assembly of indicia forming the legend to an adhesive web material by applying said adhesive web material to the exposed sides of the indicia on the intermediate carrier sheet, applying a liquid to the side of the intermediate carrier sheet opposite that to which the indicia are adhered, whereby to reduce the peel bond strength between said adhesive layer attaching the indicia to the intermediate carrier sheet and the surface of the intermediate carrier sheet to a value lower than the peel bond strength between the adhesive web material and the indicia, and peeling apart the adhesive web material and the intermediate carrier to leave the assembly of indicia adhered to said adhesive web material, each of said indicia carrying an exposed portion of said adhesive layer, and, as a final transfer step, placing the adhesive web material on the artwork with the adhesive coated indicia in contact with said artwork and adjusting the adhesive web material until the legend is in a desired position relative to the artwork and then transferring the indicia forming the legend from said adhesive web material to said artwork by applying pressure through the adhesive web material in the area of the indicia forming the legend to adhere each of the indicia to the artwork via the portions of said adhesive layer with a peel bond strength between said portions and the surface of the artwork greater than the peel bond strength between the adhesive web material and the indicia and peeling the adhesive web material away from the artwork to expose the indicia and leave the indicia each adherent to the artwork via said adhesive layer and forming said desired legend in said desired position thereon.

2. The method of claim 1 wherein the intermediate carrier is a paper.

3. The method of claim 1 wherein the liquid is selected from the class consisting of water and water/alcohol mixtures.

4. The method of claim 1 wherein the adhesive web material is a transparent or translucent plastics film bearing a coating of adhesive composition on one side thereof.

5. The method of claim 1 wherein the adhesive web is a sheet of transparent or translucent film material bearing a thin coating of a liquid on one side thereof.

6. The method of claim 1 wherein the adhesive web is a sheet of transparent or translucent film material bearing a silicone release coating on one side thereof.

7. The method of claim 1 wherein the liquid is applied to the surface of the intermediate carrier by applying thereto a sponge impregnated with the liquid.

8. In a method of producing artwork wherein a desired legend composed of characters from a dry transfer sheet is to be positioned in a selected area of a receptor surface, said characters covered with a layer of adhesive, the improvement comprising:

forming the legend on a first intermediate carrier by transferring individual characters of said legend successively from said dry transfer sheet to said first intermediate carrier so that the adhesive covered characters adhere to the first intermediate carrier and said legend reads normally left to right when the letters are viewed in place on the first intermediate carrier;

transferring the legend from said first intermediate carrier to a second intermediate carrier bearing a weak adhesive on one surface by applying the weak adhesive bearing surface of said second intermediate carrier to the exposed surfaces of the characters forming the legend on the first intermediate carrier and applying a liquid to the surface of the first intermediate carrier opposite that to which the characters are adhered to reduce the bond strength of the adhesive layer attaching the characters to the first intermediate carrier to a value lower than the bond strength between the weak adhesive layer and the characters of said legend, and withdrawing said first intermediate carrier, said second intermediate carrier being light transmitting and said legend appearing in mirror-image form when viewed in place on said second intermediate carrier, turning over said second intermediate carrier so that the legend reads normally through the light transmitting second intermediate carrier and positioning the second intermediate carrier relative to the receptor surface until the legend as viewed through said second intermediate carrier is in said selected area; and transferring said legend from said second intermediate carrier to said receptor surface so that said legend appears in said selected area.

9. A method of producing artwork according to claim 8, wherein said second intermediate carrier is coated with a low tack adhesive and has a non-rectangular shape to facilitate the user's recognition of the adhesive coated side.

10. A method of producing artwork according to claim 8, wherein said liquid is water or a mixture of water and alcohol.

* * * * *